(12) United States Patent
Legeret et al.

(10) Patent No.: US 10,234,822 B2
(45) Date of Patent: Mar. 19, 2019

(54) HYBRID TIMEPIECE OSCILLATOR

(71) Applicant: Montres Breguet S.A., L'Abbaye (CH)

(72) Inventors: Benoit Legeret, Ecublens (CH);
Deirdre Lenoir, Le Sentier (CH);
Davide Sarchi, Zurich (CH)

(73) Assignee: Montres Breguet S.A., L'Abbaye (CH)

(*) Notice: Subject to any disclaimer, the term of this patent is extended or adjusted under 35 U.S.C. 154(b) by 0 days.

(21) Appl. No.: 15/616,241

(22) Filed: Jun. 7, 2017

(65) Prior Publication Data
US 2018/0024498 A1 Jan. 25, 2018

(30) Foreign Application Priority Data
Jul. 21, 2016 (EP) .................................. 16180484

(51) Int. Cl.
| | | |
|---|---|---|
| *G04B 1/10* | (2006.01) | |
| *G04C 5/00* | (2006.01) | |
| *G04B 17/04* | (2006.01) | |
| *G04B 17/06* | (2006.01) | |
| *G04B 17/10* | (2006.01) | |

(Continued)

(52) U.S. Cl.
CPC ............. *G04B 1/10* (2013.01); *G04B 17/045* (2013.01); *G04B 17/06* (2013.01); *G04B 17/10* (2013.01); *G04B 31/00* (2013.01); *G04B 31/004* (2013.01); *G04C 5/005* (2013.01)

(58) Field of Classification Search
CPC .... G04B 17/045; G04B 17/06; G04B 17/063; G04B 17/08; G04B 17/10; G04B 17/32; G04B 31/00; G04B 31/02; G04B 31/04
See application file for complete search history.

(56) References Cited

U.S. PATENT DOCUMENTS 3,318,087 A * 5/1967 Favre .................... G04B 17/04
310/36
3,584,454 A * 6/1971 Siefert .................. G04B 18/00
368/170

(Continued)

FOREIGN PATENT DOCUMENTS

CH         704 068 A2    5/2012
EP       2 703 911 A1    3/2014

OTHER PUBLICATIONS

European Search Report dated Feb. 16, 2017 in European Application 16180484.4, filed on Jul. 21, 2016 (with English Translation of Categories of cited documents).

*Primary Examiner* — Daniel P Wicklund
(74) *Attorney, Agent, or Firm* — Oblon, McClelland, Maier & Neustadt, L.L.P.

(57) ABSTRACT

A timepiece oscillator includes a sprung balance assembly including a balance with a rim, which is returned by a balance spring and pivoted with respect to a structure, on a first side by a torsion wire, fixed by an anchoring element to the structure, and on a second side, opposite to the first side, by a contactless magnetic pivot. The balance includes a first pole embedded with the balance and the torsion wire, this first pole having a symmetry with respect to the axis of the sprung balance assembly, and cooperating with a second pole included in the structure, for the magnetic suspension of the first pole, and to exert on the distal end of the torsion wire, opposite to this anchoring element, a magnetic force for tensioning the torsion wire.

20 Claims, 4 Drawing Sheets

(51) Int. Cl.
*G04B 31/00* (2006.01)
*G04B 31/004* (2006.01)

(56) References Cited

U.S. PATENT DOCUMENTS

| | | | | |
|---|---|---|---|---|
| 3,635,013 | A | * | 1/1972 | Bertsch .................. G04B 17/10 368/169 |
| 2012/0113767 | A1 | * | 5/2012 | Marechal ............... G04B 31/00 368/287 |
| 2015/0212490 | A1 | | 7/2015 | Cordier et al. |
| 2015/0234361 | A1 | * | 8/2015 | Marechal ............... G04C 5/005 368/126 |
| 2016/0327910 | A1 | * | 11/2016 | Henein ................. G04B 17/045 |
| 2017/0160701 | A1 | * | 6/2017 | Stranczl ............... G04B 17/066 |

* cited by examiner

HYBRID TIMEPIECE OSCILLATOR

This application claims priority from European Patent Application No. 16180484.4 filed on Jul. 21, 2016, the entire disclosure of which is hereby incorporated herein by reference.

FIELD OF THE INVENTION

The invention concerns a timepiece oscillator, comprising at least one sprung balance assembly comprising a balance wheel set which itself comprises at least one balance rim and is returned by at least one balance spring.

The invention also concerns a movement including such an oscillator.

The invention also concerns a watch including such an oscillator.

The invention concerns the field of mechanical timepiece oscillators.

BACKGROUND OF THE INVENTION

The conventional oscillator of a mechanical wristwatch is the sprung balance. This type of solution has several advantages:
- very precise chronometry because of the active length of the balance spring, and its high stiffness in every degree of freedom except one (the rotation of the collet about the virtual centre) and the adjustability of the equilibrium of the balance (all the inertia is concentrated in this component);
- stability against external disturbances owing to the relatively high inertia of the balance;
- the possibility of maintaining the system by several escapement systems;
- the possibility of offsetting thermal variations relatively well;
- a relatively high quality factor, even for very low frequencies (from 2 to 10 Hz), and thus low energy consumption, and a large power reserve;
- the possibility of working with high amplitudes.

However, it also has the following undesirable features:
- pivoting, friction, and the plays of the balance staff produce differences in chronometry in the different positions of the watch;
- pivoting during rotation makes the quality factor and chronometry dependent on the tribology of the components, which also results in a risk of drift in amplitudes and rates over time;
- the requirement for perfect lubrication to optimize pivoting, which introduces an uncontrollable parameter, which can change over time or with differences in temperature and humidity;
- the difficulty in maintaining oscillations when the oscillation frequency becomes high, above 10 Hz, which is detrimental for the power reserve of these high-performance oscillators.

SUMMARY OF THE INVENTION

In 2012, MONTRES BREGUET introduced an innovative solution making it possible to overcome some of these undesirable features: the magnetic pivot. This solution made it possible to eliminate chronometric differences between the positions of the watch and led to a subsequent improvement in the quality factor and therefore in the power reserve.

However, although tribological effects are reduced by this innovation, they are still present and chronometry is still partially dependent on tribological quality.

A second solution to the undesirable features of the sprung balance was proposed by BLANCPAIN: an oscillator with a torsion wire in place of the balance staff and balance spring. This innovation makes it possible to eliminate tribology-related problems, but poses problems of principle concerning the chronometric quality of a wire compared to a spring: a wire is subject to several deformation modes, bending modes, precessions, and elimination of these modes requires the introduction of a mechanical tension applied to the settings which is difficult to control and may change over time or with temperature variation.

It is an object of the present invention to retain the advantages of the magnetic pivot and those of the torsion oscillator while eliminating the undesirable features of these two innovations, by proposing a hybrid mechanical/magnetic system, still using the sprung balance system as the oscillator element defining the rate of the watch.

To this end, the invention concerns a timepiece oscillator.

The invention also concerns a movement comprising at least one such oscillator.

The invention also concerns a watch comprising at least one such oscillator.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
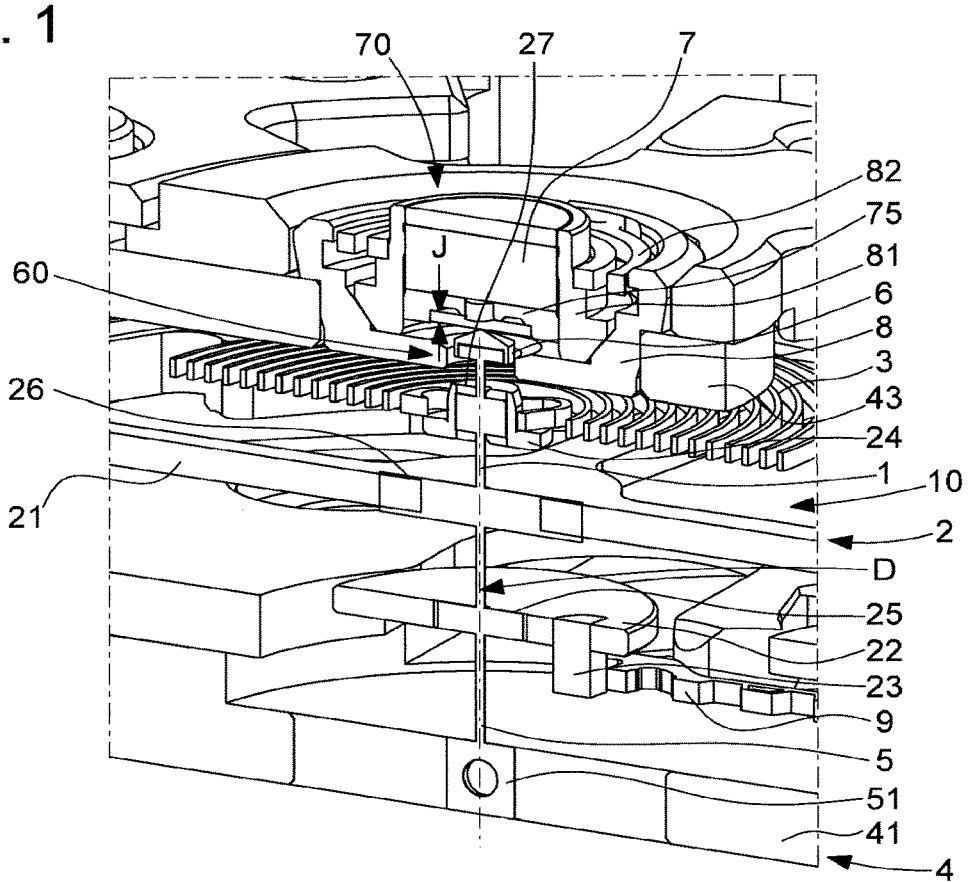
FIG. 1 shows, in a schematic manner, and in a truncated perspective view through a plane passing through the axis of pivoting of the balance, a first variant of the hybrid oscillator according to the invention, comprising a sprung balance assembly, wherein the balance is also returned by a torsion wire, the latter being rigidly secured at a first, lower end to a main plate, and free at another, upper end where it carries a weight which cooperates by means of magnetic attraction with a magnet fixed to the balance cock to ensure the wire tension, and to maintain the balance on its theoretical axis.

It is an object of the invention to combine the advantages of a magnetic pivot and a torsion oscillator, while eliminating the undesirable features of these two innovations, by proposing a hybrid mechanical/magnetic system, still using the sprung balance system as the oscillator element defining the rate of the watch.

The invention therefore concerns a timepiece oscillator 100, comprising at least one sprung balance assembly 10, which comprises, in a conventional manner, a balance wheel set 1, which itself comprises at least one balance rim 2 and which is returned by at least one balance spring 3.

According to the invention, balance wheel set 1 is pivoted with respect to a structure 4, on a first side by at least one torsion wire 5, which is fixed at a first end by a stiff anchoring element 51 or via a parachute spring 51' to structure 4, and on a second side, opposite the first side, by a contactless magnetic pivot.

Figure 2:
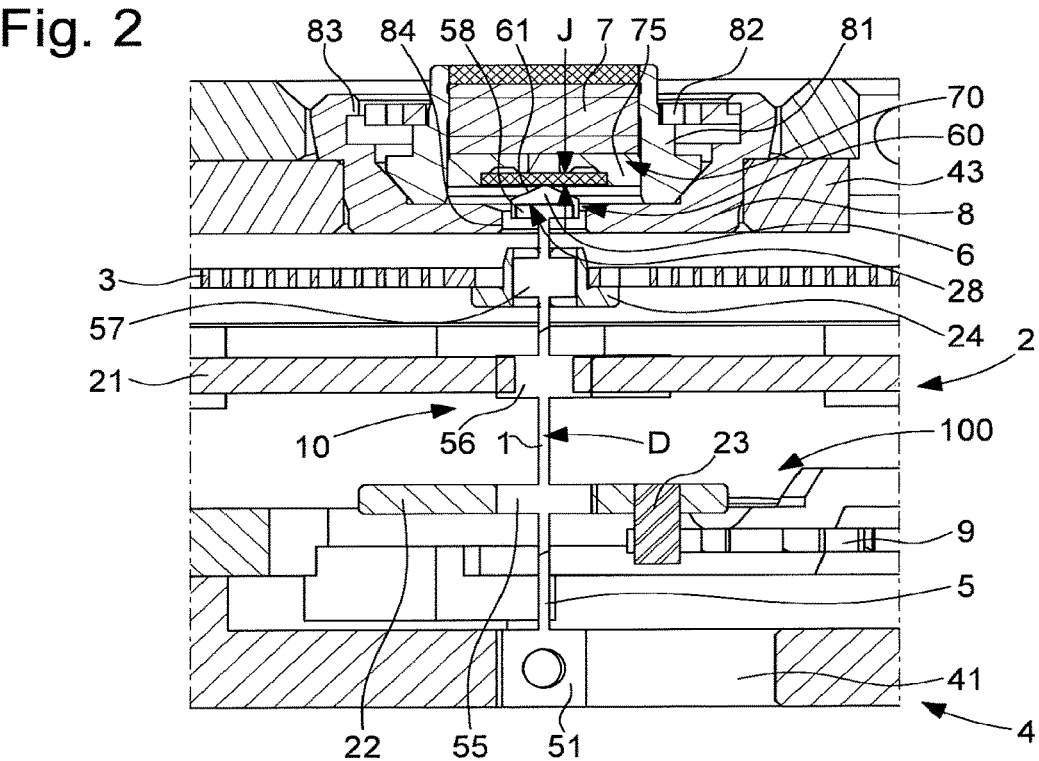
FIG. 2 is a cross-sectional view, along the same plane, of the oscillator of FIG. 1.
Figure 10:
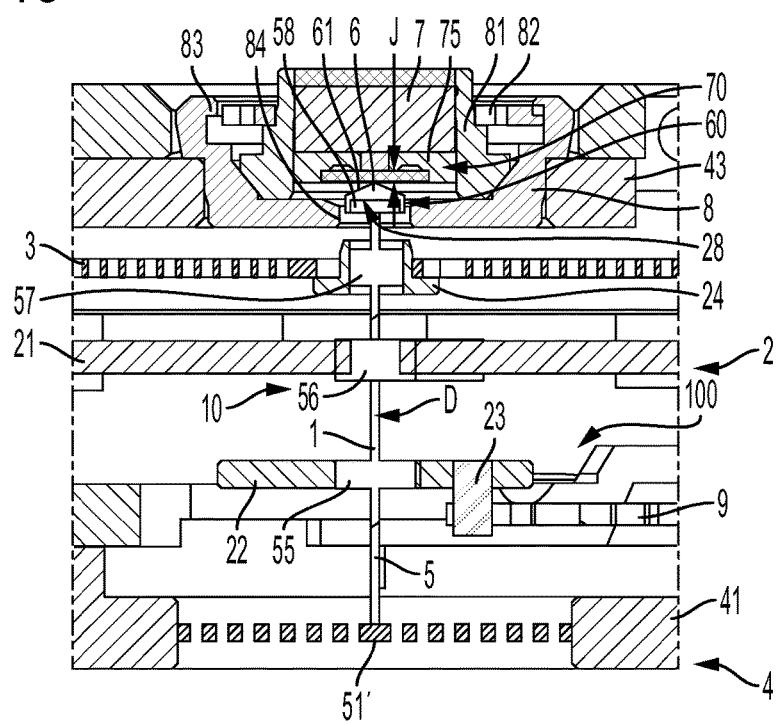
FIG. 10 is a cross-sectional view of another oscillator.

FIGS. 1 and 2 illustrate the case of a stiff anchoring element 51. In a variant that is illustrated in FIG. 10, this first end is fixed to a parachute spring 51', which is itself fixed to structure 4, and consequently has one degree of axial freedom, which is limited by the stiffness of the parachute spring 51'.

This contactless magnetic pivot is arranged to exert on a second distal end of torsion wire 5, opposite to the first end set in anchoring element 51, a magnetic tension force in a direction which is preferably that of axis D of sprung balance assembly 10. To this end, balance wheel set 1 comprises at least a first pole 60, which is embedded with balance wheel set 1 and the at least one torsion wire 5. Each at least one first pole 60 has a symmetry with respect to a plane passing through axis D, or, more particularly, a symmetry with respect to axis D. This at least one first pole 60 cooperates, for the magnetic suspension thereof, and for the tensioning of at least one torsion wire 5, with at least a second pole 70, 71, 72, comprised in structure 4, notably a balance cock 43 in the Figures, in a resultant magnetic field with axial symmetry, of axis D. This resultant axial magnetic force thus allows the radial recentring of the embedded pole 60, the axial realignment of torsion wire 5, and radial centring of balance wheel set 1.

Indeed, except for balance spring 3, the second pole 70, 71, 72, acts on the sprung balance assembly 10, especially on the at least one first pole 60, to recentre it in the direction of axis D. The recentring of balance wheel set 1 is thus not simply a consequence of the axial recentring of torsion wire 5.

The resultant magnetic field with axial symmetry thus exerts both a magnetic force for axially tensioning the at least one torsion wire 5, for the axial holding of torsion wire 5, and a magnetic force for radially centring balance wheel set 1.

By convention, hereafter anything related to torsion wire 5 and to balance wheel set 1 will be termed "first", and anything related to structure 4, on the distal end side of torsion wire 5, is termed "second".

It is understood that the interaction is a magnetic interaction between a first pole 60 and a second pole 70, 71, 72:
  either by a force of attraction, which allows the cooperation by means of attraction between a first magnet and a second magnet, or between a first magnet and a second magnetized part, or a first magnetized part and a second magnet,
  or by a force of repulsion, which is only achievable with a first permanent magnet and a second permanent magnet, or a first magnet and a second diamagnetic component, or a first diamagnetic component and a second magnet.

Depending on the configuration chosen, a pole can thus consist of a permanent magnet, or of a diamagnetic component, or of a ferromagnetic part. The formulation "pole piece" used hereafter does not exclusively concern permanent magnets, although this is a preferred embodiment.

The invention is achievable in several variants, including a variant comprising at least one permanent magnet on the balance which is particularly advantageous but not limiting.

The dimensions of the magnetic interaction are calculated such that the fields present are sufficient to exert on the distal end of torsion wire 5 a sufficient force to tension it properly, in all positions in space, and resisting ordinary accelerations.

Figure 6:
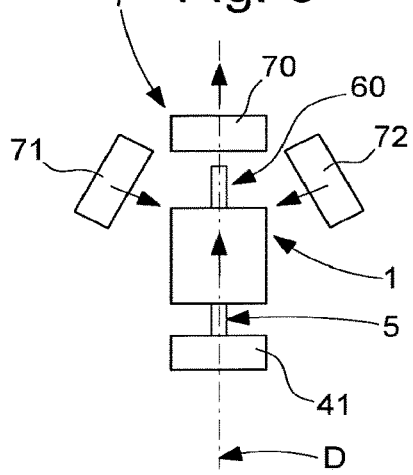
FIG. 6 is a side view diagram, showing an axial pole piece which tends to attract the balance wheel set, whereas lateral pole pieces tend to repel it, to maintain it properly on its axis.

Naturally, although this tension force F is necessarily orientated in axial direction D of the sprung balance assembly 10, it may be the resultant of axial, radial or even oblique fields, as seen for example in FIG. 6.

In a particular implementation, torsion wire 5 is a wire working in pure torsion, as described in CH Patent Application 01571/12 in the name of BLANCPAIN SA.

In a variant, the at least one torsion wire 5 is a network with a plurality of elementary wires together forming one torsion wire. Each of these elementary wires may be either one such wire working in pure torsion, or a wire working in bending mode or, more precisely, in a combined torsion and bending mode. Although the composition of torsion wire 5 may take very different forms, the essential is that the tension of the torsion wire can be ensured in axial direction D.

More particularly, at least one first pole 60 has a symmetry of revolution with respect to axis D of sprung balance assembly 10. More particularly still, each first pole 60 has a symmetry of revolution with respect to axis D.

In a first variant illustrated in FIGS. 1 and 2, at least one first pole 60 cooperates by means of magnetic attraction with at least one second pole 70. And, more particularly, each first pole 60 cooperates by means of magnetic attraction with at least one second pole 70.

Figure 8:
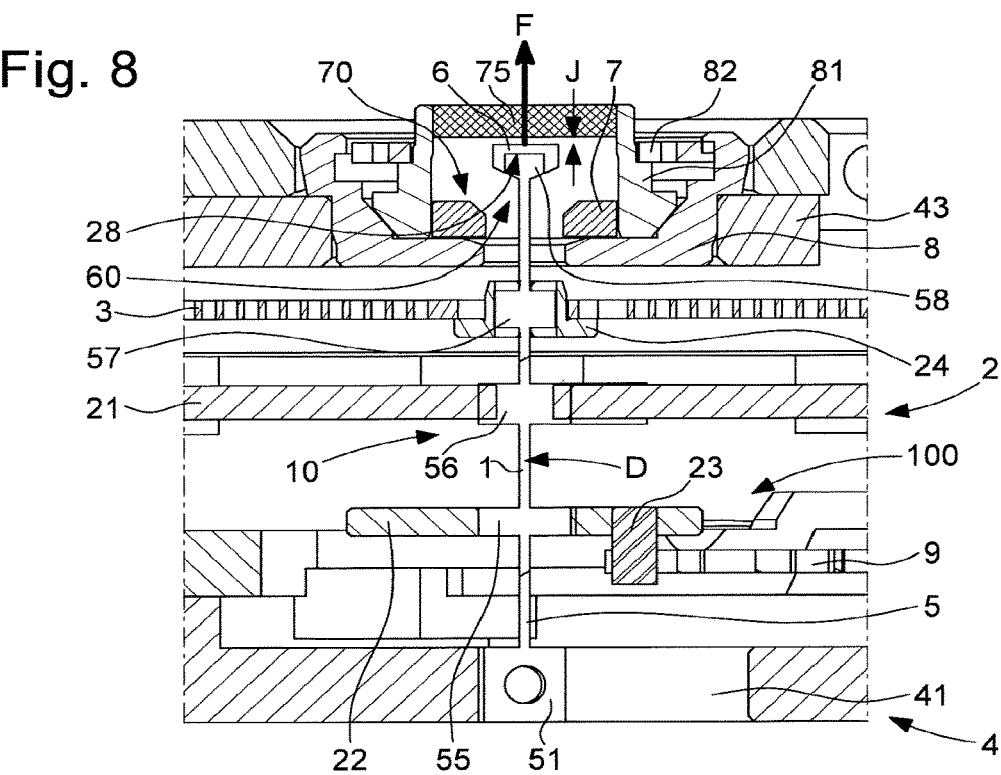
FIG. 8 represents, in a similar manner to FIG. 2, a second variant of the hybrid oscillator according to the invention, wherein the weight cooperates by means of magnetic repulsion with a magnet fixed to the cock to ensure the wire tension and to maintain the balance on its theoretical axis.

In a second variant illustrated in FIG. 8, at least one first pole 60 cooperates by means of magnetic repulsion with at least one second pole 70. The combination of at least one, preferably axial, tension connection of the wire and oblique or radial connections, preferably with symmetry of revolution, in magnetic repulsion, is possible. FIG. 8 shows a non-limiting embodiment wherein a first wire end pole 60, comprising a movable weight 6, is beyond the pole pieces, to obtain magnetic repulsion in the direction allowing the wire to be tensioned. This variant is advantageous in terms of the overall thickness of the movement. More particularly, each first pole 60 cooperates by means of magnetic repulsion with at least one second pole 70.

More particularly, at least one first pole 60 is a movable weight 6, notably a permanent magnet, independent of balance wheel set 1 and remote from the latter.

More particularly, at least one second pole 70 is a pole piece 7. More particularly, this pole piece 7 has a symmetry of revolution about axis D and is independent of any external energy source.

The Figures show, in proximity to this pole piece 7, a non-magnetic spacer 75, arranged to limit the travel of first pole 60.

According to the invention, this balance wheel set 1 is pivoted with respect to a structure 4, on a first side by at least one torsion wire 5, and on a second side, opposite the first side, by a contactless magnetic pivot. To achieve this contactless pivot, balance wheel set 1 includes at least one movable weight 6, having a symmetry with respect to axis D, or more particularly a symmetry of revolution with respect to axis D. More particularly, at least one such movable weight 6 cooperates, for the magnetic suspension thereof, with at least one pole piece 7 comprised in structure 4, seen in attraction in FIGS. 1 and 2, or in repulsion in FIG. 8.

FIG. 6 illustrates a particular variant, wherein an axial pole piece 70 tends to attract balance wheel set 1, whereas lateral pole pieces tend to repel it, to hold it properly on its axis. The reverse configuration is also possible.

Figure 7:
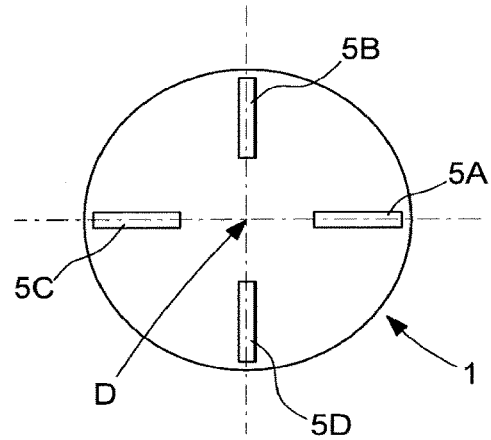
FIG. 7 is a schematic top view showing a torsion wire in the form of a bundle containing a plurality of elementary wires, regularly distributed around the axis.
Figure 9:
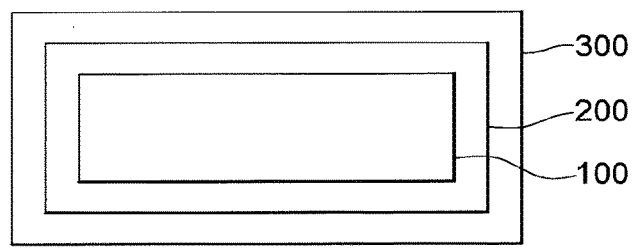
FIG. 9 is a block diagram representing a watch including a movement with such an oscillator.

In a variant illustrated in FIG. 7, the at least one torsion wire 5 is a bundle containing a plurality of torsion wires 5A, 5B, 5C, and 5D regularly distributed about axis D, and each supported on a plane passing through axis D, or on a plane parallel to a plane passing through axis D, or by an helix developing about axis D, for example if the wires are braided together.

It is possible to fabricate a braided wire on the horological scale, and more specifically by using silicon, silicon nitride or carbide, NiP (nickel-phosphorus) or metallic glasses. Braided wires exist as light guides, and the of the cross-sectional dimension of the wires is on the order of the cross-section required for an oscillator type application.

In the variant illustrated in FIGS. 1 to 6, and 8, the at least one torsion wire 5 is a single torsion wire 5 extending at least along axis D, i.e. comprising at least one main, slender, rectilinear portion along axis D, which is the only one to work in torsion, and, depending on the case, comprising one or more radially extending wings hereafter called "shoulders" 55, 56, 57, 58, which are less fragile than the rectilinear area of the wire subjected to the torsion torque, and which are arranged to allow the attachment of various components, comprised in balance wheel set 1, directly on torsion wire 5 without damaging the latter.

Thus, in a particular variant, the at least one torsion wire 5 comprises a slender portion extending substantially in the direction of axis D, and at least one radial extension shoulder 55, 56, 57, 58 for the attachment thereof to a roller 22 comprised in balance wheel set 1, and/to an axial portion 21 comprised in balance rim 2, and/or to a collet 24 comprised in balance wheel set 1 for the attachment of a balance spring 3, and or to movable weight 6.

More particularly, each shoulder 55, 56, 57, 58, is substantially flat and is arranged for insertion into a slot 25, 26, 27, 28, comprised in balance rim 2, and/or into a collet 24 comprised in balance wheel set 1 for the attachment of a balance spring 3, and/or into movable weight 6.

In a particular variant (not illustrated), the at least one torsion wire 5 is a single torsion wire 5 extending at least along axis D, and comprising a single radial shoulder grouping together all the shoulders 55, 56, 57, 58.

In a particular variant (not illustrated), the at least one torsion wire 5 is a single torsion wire 5 extending at least along axis D, and comprising a first pair of shoulders, among radial extension shoulders 55, 56, 57, 58, grouping together two shoulders 55, 56, for the attachment thereof to roller 22 and to axial portion 21 of balance rim 2, and a second pair of shoulders grouping together two shoulders 57, 58, for the attachment thereof to collet 24 and to movable weight 6.

In a particular variant (not illustrated), the at least one torsion wire 5 is a single torsion wire 5 extending at least along axis D, and comprising a single first shoulder among radial extension shoulders 55, 56, 57, 58, and a pair of shoulders or a triplet of shoulders from among the other radial extension shoulders 55, 56, 57, 58 that are different from this first shoulder.

In another particular variant (not illustrated), the at least one torsion wire 5 is a single torsion wire 5 extending at least along axis D, and comprising a first pair of shoulders among radial extension shoulders 55, 56, 57, 58, and two separate shoulders from among the other radial extension shoulders 55, 56, 57, 58 that are different from this first pair of shoulders.

In the particular variant illustrated by the Figures, the at least one torsion wire 5 comprises an end anchoring element 51 for the setting thereof in a main plate 41 comprised in structure 4, and extends substantially perpendicularly and overhanging with respect to plate 41.

The invention therefore constitutes a hybrid oscillator, since it includes two different means of return: the balance spring 3 (or balance springs 3), and the torsion wire 5 (or torsion wires 5), whose effects are combined.

The frequency of such a hybrid oscillator is given by a combination of the stiffness kspiral of balance spring 3 and the stiffness kfil of wire 5 under torsion, by the relation:

$$f=\sqrt{[(k_{spiral}+k_{fil})/J]}/(2\pi)$$

The invention is advantageous when the stiffness of wire 5 is much lower than the stiffness of balance spring 3, especially when $k_{fil} \leq k_{spiral}/10$, since, in that case imprecisions in the fabrication or positioning of the wire may produce errors of rate limited to a value of around 1 to 10 seconds per day—errors which can easily be corrected by the usual systems for adjusting the sprung balance, such as ablation of material from the rim, adjustment screws, elastic strips, off-centre clicks, or other means.

The name "torsion" wire refers to the stiffness contribution of the wire, but in practice the least stiffness is sought, compared to the stiffness of the balance spring.

FIG. 7 illustrates an advantageous variant comprising a "composite" wire, where several simple wires, particularly in the form of strips 5A, 5B, 5C, 5D, especially but not limited to strips of rectangular cross-section, and more particularly but not limited to strips fixed slightly off-centre with respect to axis of rotation D of the sprung balance, together form a "torsion" wire, but wherein each strip is deformed notably in bending/torsion. A system of this type is more resistant to shocks and gives the least torsional stiffness. The stiffness kfil of wire 5 is thus the resulting stiffness of these simple wires.

Thus, in a particular and advantageous variant, the torsional stiffness of the set of all the torsion wires 5 comprised in oscillator 100 is at least ten times lower than the torsional stiffness of the least stiff balance spring 3 comprised in oscillator 100.

In a particular variant, and especially in that illustrated by FIGS. 1 and 2, each torsion wire 5 is made of single crystal silicon, with a rectangular cross-section less than or equal to 5 micrometers×10 micrometers, and is subjected to a magnetic tension force of intensity greater than or equal to 7 m·N.

In a particular variant, this tension force is limited to an upper value of 9 m·N, which is suitable for watches devised for common use, and avoids unnecessarily oversizing the magnetic components and consequently the entire movement.

For very particular applications, for example in aeronautics or astronautics, and particularly for high acceleration usage, each such torsion wire 5 is subjected to a magnetic tension force of intensity greater than or equal to 15 nM. Advantageously, and as seen in FIGS. 1, 2 and 8, movable weight 6 includes a portion 61 that is conical along axis D, and pointed on the side of pole piece 7 with which it cooperates. Indeed, although the Figures represent only one movable weight 6 and only one pole piece 7, it is possible to create an axial series of several movable weights 6 and/or of several pole pieces 7.

In a design variant, no interference torque is generated on axis D, but wherein neither pole 6 nor pole 7 has axial symmetry. This is, for example, the case if the at least one pole 6 or 7 is off-centre with respect to axis D, and if pole 7 or 6 is a ring interacting with the at least one pole 6 or 7. It is, however, difficult to develop a design where the two are asymmetrical, without producing a torque detrimental to chronometry. Thus, more particularly, at least one of the two poles has an axial symmetry of revolution.

According to a particular feature, at rest, along axis D, a play J with a value from 5 to 40 micrometers extends between the tip of conical portion 61 and an end wall forming a stop: one surface of pole piece 7, or preferably a non-magnetic spacer 75 in FIGS. 1 and 2, or an element of structure 4 in FIG. 8.

More particularly, pole piece 7 is housed inside a setting 81, which is suspended by a parachute spring 82 to a cabochon 8 housed inside a bar 43 comprised in structure 4. This cabochon 8 includes a pipe 84 forming a radial stop for movable weight 6 in the event of a shock.

The invention also concerns a timepiece movement 200 comprising at least one such oscillator 100.

The invention also concerns a watch 300 including at least one such oscillator 100.

In short, the invention concerns a hybrid oscillator combining a conventional sprung balance with a torsion wire also returning the balance:
- a torsion wire is fixed at only one end, instead of two as in the aforecited BLANCPAIN prior art;
- the balance spring remains; the total stiffness depends greatly on the stiffness of the balance spring, which is between 10 and 100 times greater than the stiffness of the wire under torsional deformation;
- at least one magnetic weight (magnet or ferromagnetic component) is positioned close to the free end of the wire (that opposite to the attachment), this magnetic weight being, in a particular but non-limiting embodiment, fixedly secured to a parachute spring mounted on the main plate or on the balance cock;
- a rim, a balance spring (via a collet), and a small roller are fixed to the wire, which has one or more shoulders whose function is to support these components;
- a magnetic weight (magnet or ferromagnetic component) having at least an axial and preferably cylindrical symmetry, thus, under rotation, is positioned fixed to the free end of the wire, which has a shoulder for this purpose. This weight is thus opposite the other magnetic weight fixed to the main plate or the balance cock. In the case where the two weights are magnets, the two magnets are polarized to attract each other in a first variant, or repel each other in a second variant.

Variants may be envisaged:
- the two magnetic weights may be magnet/magnet or magnet/ferromagnetic or ferromagnetic/magnet;
- third and fourth magnetic weights may be fixed, respectively, to the wire close to the mechanical setting and on the main plate or the cock facing the wire at the setting. These weights then have the function of increasing the radial stability of the wire;
- the wire may be magnetically permeable or non-magnetic;
- the wire may be formed by several microstructured strips to increase its mechanical resistance;
- lateral stop members in proximity to the mechanical free end of the wire and the rim may be introduced to ensure mechanical resistance in the event of a large shock.

Figure 3:
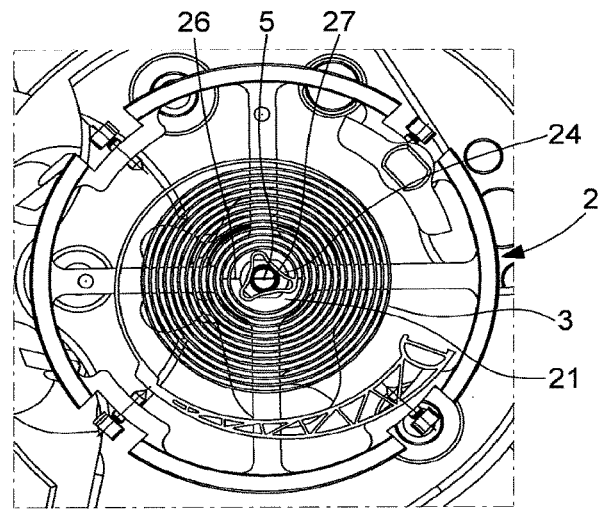
FIG. 3 is a plan view which shows the attachment of the wire to the collet.
Figure 4:
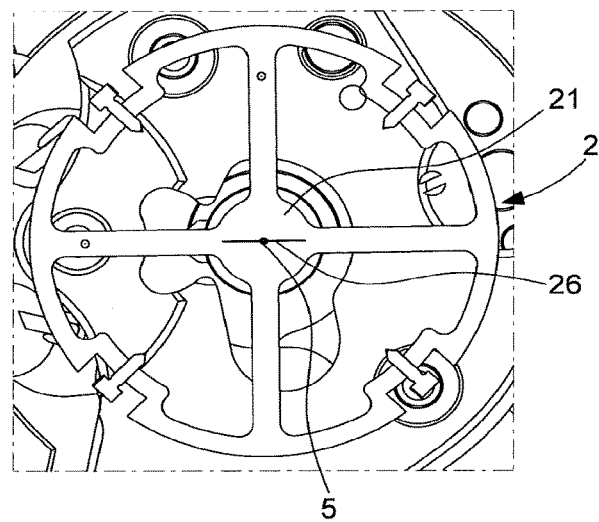
FIG. 4 is a plan view which shows the attachment of the wire to the rim.
Figure 5:
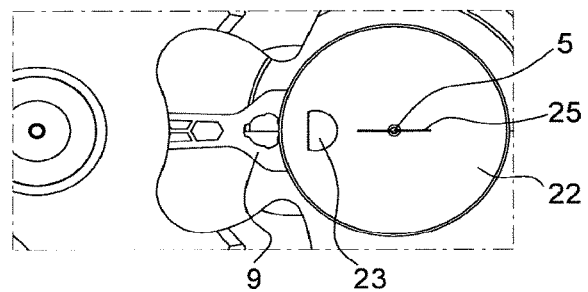
FIG. 5 is a plan view which shows the attachment of the wire to the single roller.

FIGS. 1 and 2 illustrate the first, magnetic attraction variant. Wire 5 is set in main plate 41 of structure 4 in an anchoring element 51. A magnet 7 is fixed to parachute spring 82 of balance cock 43. On wire 5, four shoulders 55, 56, 57, 58 forming enlarged portions of the strip/wire have the function of allowing the attachment, particularly by bonding or similar means, respectively of a roller 22, a rim 21 of the balance 2, a collet 24 with its balance spring 3 and a ferromagnetic component 6 of conical shape, here in cylindrical symmetry. The detail of these attachments is seen in FIGS. 3 to 5. Component 8 which carries magnet 7 of the balance cock has a pipe 84 which works as a lateral stop member in the event of a large shock, FIG. 8 illustrates the second, magnetic repulsion variant, the place of magnet 7 is shifted and moved closer to plate 41, and movable weight 6 is housed beyond magnet 7.

A single crystal silicon wire of length 2 mm, with a rectangular cross-section of 5 microns×10 microns has a torsional stiffness 100 times lower than the stiffness of a typical balance spring allowing oscillation of 10 Hz (for example the BREGUET 7400 calibre), if coupled to a balance having an inertia J=2.5 mg cm$^2$.

A wire with these dimensions, fixed at one end and subjected to a magnetic tension force of 15 mN, and subjected to a torsion of 100°, presents mechanical stresses of 400 MP, below the maximum stress limit by a factor comprised between 2 and 3 (just like a balance spring).

The variant wherein a single shoulder is used for the attachment of the four components to the wire is the closest to the conventional system. Each component rotates by the same angle during twisting of the wire.

The most advantageous variant for maintaining the system is that using two different shoulders, the balance spring/rim/ferromagnetic component assembly being fixed on the first shoulder (this shoulder is close to the free end of the wire), and the small roller being fixed on the second shoulder (closer to the attachment of the wire). In this configuration, the angle of rotation of the small roller is less than the angle of rotation of the balance spring/rim/ferromagnetic component assembly, thus the maximum rotational speed of the small roller is less than the rotational speed of a conventional balance having the same frequency and amplitude: this novel property allows more efficient maintenance of the system since the escapement mechanism can more easily transfer energy to the small roller, and thus to the oscillator.

The invention is disclosed here with magnetic suspension. It can naturally also be implemented with electrostatic type suspension, or even with a magnetic/electrostatic combination.

The invention provides significant advantages:
- no friction in the pivots during oscillation;
- low dependency of chronometry on the position of the watch;
- use of standard techniques for chronometric adjustment, temperature compensation and maintenance;
- suitable for a wristwatch;
- suitable for a navy chronometer;
- suitable for static use.

What is claimed is:

1. A timepiece oscillator, comprising:
at least one sprung balance assembly including a balance wheel set, wherein the balance wheel set includes at least one balance rim and returned by at least one balance spring, wherein said balance wheel set is pivoted with respect to a structure, on a first side of said structure by at least one torsion wire fixed by a stiff anchoring element or by means of a first parachute spring to said structure, and on a second side of said structure, opposite to said first side of said structure, by a contactless magnetic pivot, said balance wheel set comprising at least one first pole embedded with said at least one torsion wire, each said at least one first pole having a symmetry with respect to a plane passing through an axis of said sprung balance assembly, and said at least one first pole cooperating with at least one second pole comprised in said second side of said structure, for the magnetic suspension of said at least one first pole, and to exert on the distal end of said at least one torsion wire, opposite to said anchoring element, in a resultant magnetic field with axial symmetry, a magnetic force for axially tensioning said at least one torsion wire, for the axial holding of said at least one torsion wire, and a magnetic force for radially centering said balance wheel set.

2. The oscillator according to claim 1, wherein said at least one first pole has a symmetry of revolution with respect to said axis of said sprung balance assembly.

3. The oscillator according to claim 1, wherein said at least one first pole cooperates by means of magnetic attraction with said at least one second pole.

4. The oscillator according to claim 3, wherein each of said at least one first pole cooperates by means of magnetic attraction with said at least one second pole.

5. The oscillator according to claim 1, wherein at least said at least one first pole cooperates by means of magnetic repulsion with said at least one second pole.

6. The oscillator according to claim 5, wherein each of said at least one first pole cooperates by means of magnetic repulsion with said at least one second pole.

7. The oscillator according to claim 1, wherein one of said at least one first pole is a movable weight independent of said balance wheel set.

8. The oscillator according to claim 7, wherein said at least one torsion wire includes a slender portion extending substantially in the direction of said axis, and at least one radial extension shoulder for the attachment thereof to a roller comprised in said balance wheel set, and/or an axial portion comprised in said balance rim, and/or to a collet comprised in said balance wheel set for the attachment of said at least one balance spring, and/or to said movable weight.

9. The oscillator according to claim 8, wherein each of said at least one radial extension shoulder is substantially flat, and is arranged for insertion into a slot comprised in said balance rim, or into said collet comprised in said balance wheel set for the attachment of said at least one balance spring, or into said movable weight.

10. The oscillator according to claim 7, wherein one of said at least one second pole is a pole piece and wherein said movable weight comprises a portion that is conical along said axis and pointed on the side of said pole piece.

11. The oscillator according to claim 10, wherein, at rest, along said axis, a play with a value of 5 to 40 micrometers extends between a tip of said portion that is conical and said pole piece.

12. The oscillator according to claim 7, wherein one of said at least one second pole is a pole piece and wherein said pole piece is housed inside a setting suspended by a second parachute spring to a cabochon housed inside a bridge comprised in said structure, said cabochon includes a pipe forming a radial stop for said movable weight in the event of a shock.

13. The oscillator according to claim 1, wherein one of said at least one second pole is a pole piece with symmetry of revolution about said axis and independent of any external energy source.

14. The oscillator according to claim 1, wherein said at least one torsion wire is a bundle grouping together of a plurality of torsion wires regularly distributed around said axis and each of the plurality of said torsion wires is supported on a plane passing through said axis or on a helix developing around said axis.

15. The oscillator according to claim 1, wherein said at least one torsion wire is a single torsion wire extending at least along said axis.

16. The oscillator according to claim 1, wherein said at least one torsion wire comprises said stiff anchoring element for the setting thereof in a main plate comprised in said structure, and extends substantially perpendicularly and overhanging with respect to said plate.

17. The oscillator according to claim 1, wherein the torsional stiffness of all of said at least one torsion wire comprised in said oscillator is at least ten times lower than the torsional stiffness of the least stiff of said at least one balance spring comprised in said oscillator.

18. The oscillator according to claim 1, wherein each of said at least one torsion wire is made of single crystal silicon, with a rectangular cross-section less than or equal to 5 micrometers ×10 micrometers, and is subjected to a magnetic tension force of intensity greater than or equal to 7 mN.

19. A timepiece movement comprising:
at least one of said oscillator according to claim 1.

20. A watch comprising:
at least one of said oscillator according to claim 1.

* * * * *